United States Patent
Vogl (10) Patent No.: US 10,436,261 B2
(45) Date of Patent: Oct. 8, 2019

(54) DISCONNECTING OVERLOAD CLUTCH WITH TRANSMISSION BODIES ARRANGED IN GROUPS

(71) Applicant: Chr. Mayr GmbH + Co. KG, Mauerstetten (DE)

(72) Inventor: Norbert Vogl, Rott (DE)

(73) Assignee: Chr. Mayr GmbH + Co. KG, Mauerstetten (DE)

( * ) Notice: Subject to any disclaimer, the term of this patent is extended or adjusted under 35 U.S.C. 154(b) by 436 days.

(21) Appl. No.: 15/315,037

(22) PCT Filed: May 28, 2015

(86) PCT No.: PCT/EP2015/061808
§ 371 (c)(1),
(2) Date: Nov. 30, 2016

(87) PCT Pub. No.: WO2015/185435
PCT Pub. Date: Dec. 10, 2015

(65) Prior Publication Data
US 2017/0198763 A1    Jul. 13, 2017

(30) Foreign Application Priority Data

Jun. 3, 2014    (DE) .................. 10 2014 008 287

(51) Int. Cl.
*F16D 43/206* (2006.01)
*F16D 7/08* (2006.01)
*F16D 15/00* (2006.01)
(52) U.S. Cl.
CPC ............ *F16D 43/206* (2013.01); *F16D 7/08* (2013.01); *F16D 15/00* (2013.01)
(58) Field of Classification Search
CPC ................ F16D 43/206; F16D 7/08
(Continued)

(56) References Cited

U.S. PATENT DOCUMENTS 3,774,738 A   11/1973 Steinhagen
4,220,230 A   9/1980 Hansen
(Continued)

FOREIGN PATENT DOCUMENTS

DE    25 17 910 A1   11/1976
DE    33 30 287 A1   3/1984
(Continued)

OTHER PUBLICATIONS

English language version of the International Preliminary Report on Patentability prepared by the International Bureau for PCT/EP2015/061808, dated Dec. 6, 2016, 9 pages.
(Continued)

*Primary Examiner* — Charles A Fox
*Assistant Examiner* — Ryan P Dodd
(74) *Attorney, Agent, or Firm* — Chernoff Vilhauer LLP (57) ABSTRACT

Disconnecting overload clutch, comprising a hub (5) which has axially directed hub recesses (4) arranged on the periphery thereof, a pressure flange (1) mounted on the hub (5) in a rotatable manner with axially directed pressure flange depressions (2), wherein in each hub recess (4), for example, two rotationally symmetrical transmission bodies (3,9) are arranged, which are pressed into the pressure flange depressions (2) by spring elements (6) via a switch element (7). According to the invention, the switch element (7) has axially projecting switch element cams (8) facing the front-end exposed surface (21) thereof, which in the engaged state transfer the force of the spring elements (6)to the transmission bodies (3,9) and thus axially engage with the hub recesses (4). When disengaging, the switch element (7) experiences an axial displacement and rotary movement with the switch element cams (8) in relation to the hub (5), so that the switch element cams (8) are transferred into a position wherein same transfer the force of the spring
(Continued)

elements (6) only onto a support surface (20) of the hub (5) with the result that the clutch can freely come to a stop.

14 Claims, 5 Drawing Sheets

(58) Field of Classification Search
USPC .................................................... 192/56.57
See application file for complete search history.

(56) References Cited

U.S. PATENT DOCUMENTS

| | | | | | |
|---|---|---|---|---|---|
| 4,668,206 | A | * | 5/1987 | Fukumoto | F16D 43/206 |
| | | | | | 192/56.57 |
| 4,838,400 | A | * | 6/1989 | Fortune | F16D 43/206 |
| | | | | | 192/56.57 |
| 5,307,912 | A | * | 5/1994 | Girguis | F16D 43/206 |
| | | | | | 192/109 R |

FOREIGN PATENT DOCUMENTS

| | | |
|---|---|---|
| DE | 37 27 484 A1 | 2/1988 |
| DE | 42 22 574 A1 | 3/1993 |

OTHER PUBLICATIONS

International Search Report prepared by the European Patent Office for PCT/EP2015/061808, dated Sep. 9, 2015, 6 pages.
Written Opinion prepared by the European Patent Office for PCT/EP2015/061808, dated Sep. 9, 2015, 7 pages.

* cited by examiner

Fig. 9
(E-E)
engaged

Fig. 10
(E-E)
disengaged

Fig. 11

DISCONNECTING OVERLOAD CLUTCH WITH TRANSMISSION BODIES ARRANGED IN GROUPS

In the field of industrial drive engineering the mechanical overload clutch has long established itself as a reliable machine part for preventing damage through excessive torques.

With mechanical overload clutches, depending on the respective mode of use, various concepts of functionality are implemented:

Ratcheting clutches for more simple drives.
Synchronous clutches with true re-engagement angle.
Disengaging clutches with manual re-engagement.
Disengaging clutches with automatic re-engagement.

The subject of the disclosed invention is a technical improvement for disconnecting overload clutches according to the preamble of the independent claim.

According to the state of the art disengaging clutches are known for which (following activation or disengagement of the clutch) re-engagement is achieved by slow reverse turning between the drive input part and the output part.

Such a disengaging clutch is disclosed in DE 37 27 484 C2. In this disengaging clutch according to the state of the art torque transfer follows from a drive input element (here denoted as a pressure flange) through a so-called switch element to a drive output element hereinafter described as a hub. The switch element is herein rotationally attached to the hub yet axially movable.

First balls in an outer reference circle and placed in a ball cage, preferably with equal separation, serve as transfer bodies for the transmission of torque. The first balls, which serve as transfer bodies, are held in the cone-shaped recesses in the pressure flange and switch element by a spring element centralized on the hub.

Upon activation (that is disengagement) of the clutch through exceeding a torque defined by the power of the spring element the first balls migrate out of the cone-formed recesses in the pressure flange and switch element and thereby perform a rolling motion on the surfaces of the recesses. As a result of these rolling motions a rotation occurs between the ball cage (with the first balls located therein) and the switch element and likewise between the ball cage and the pressure flange.

On a separate inner reference circle of the ball cage are arranged support balls which, upon the rotation between the ball cage and the switch element, enter special support recesses in the switch element and thereby prevent re-engagement of the disengaging clutch.

So-called impact bodies (hereinafter referred to as control pins) which are driven towards the switch element through the force of the spring element are located in bores on a third outer reference circle on the pressure flange and slide on a ramp furnished control cam of the switch element.

After disengagement of the known disengaging clutch, according to the above state of the art, the switch element and the ball cage find themselves in a relative angular position to each other wherein, during running down of the disengaging clutch, the control pins slide on the cam and the ramps of the switch element.

After the clutch has come to a halt and the cause of the disruption (the overload) has been eliminated the direction of rotation between the pressure flange and switch element is reversed and there follows a slow reverse rotation between those two parts. Thereby, through the interaction of pressure flange, control pins, switch element and the retaining edges of the ball cage, the ball cage with first and second balls is rotated back to the original middle position, the disengaging clutch re-engages and is again ready for use.

The disadvantage of the disconnecting clutch according to the above-described state of the art according to DE 37 27 484 is the complicated construction having a high number of mutually interacting functional parts. The complicated construction of the clutch inclines it towards relatively short operational times prior to failure, it is not suitable for operation in rough environments and is relatively expensive to manufacture.

Similar overload clutches are known from the state of the art according to DE 42 22 574 A1 and DE 33 30 287 A1.

The aim of the present invention is therefore to present a disconnecting clutch of the class presented above that in relation to the clutch according to the state of the art satisfies the following requirements and therefore is clearly advantageous over the known state of the art:

simpler construction of the clutch with fewer functional parts.
Robust implementation of the clutch.
High reliability over a long operational time.
Simple and cost-effective manufacture of the clutch.

This requirement profile is solved by the disconnecting clutch with the features of claim 1.

It is therefore proposed that the clutch be designed in such a manner that upon disengagement of the clutch the torque transmitting components of the disconnecting clutch effect disconnection without any further additional parts. This is achieved in that the transmission bodies serving to transmit torque are arranged in pairs one behind another in recesses of the hub, preferably in the axial direction. Transmission bodies held in recesses of the pressure flange by the force of spring elements thereby transmit in the connected condition torque between pressure flange and hub.

Upon a torque defined through the strength of the spring elements being exceeded the first transmission bodies move out of depressions in the pressure flange in a rolling movement until they lie on plane faces situated next to the depressions of the pressure flange in the circumferential direction. The rolling movement of the first transmission bodies leads to an opposite turning movement of the second transmission bodies being in contact therewith which are arranged between the first transmission bodies and the switch element and transmit the force of the spring elements to the first transmission bodies.

Ultimately, the turning movement of the second transmission bodies being in contact with the switch element results in a turning of the switch element in relation to the hub in the same rotational direction as the pressure flange to the hub. Due to the described turning the switch element which in the engaged state of the clutch transmits the force of the spring elements onto the transmission bodies, is transferred to a position in which lobes of the switch element which would otherwise be immersed in recesses of the hub are supported on a flat surface of the hub. The first transmission bodies are thereby no longer returned to the depressions of the pressure flange and the clutch can run down in the absence of contact between the bodies and the pressure flange.

To re-engage the disconnecting clutch following rectification of the fault (that is to say the overload) the rotational direction between the hub and pressure flange is reversed. A mechanism is thereby brought into action which—similar to that described above in relation to the state of the art—by way of control pins of the switch element, the hub and the pressure flange are again turned to an angular position in which the transmission bodies are engaged with depressions in the pressure flange through the force of the spring elements. Following this described reverse turning the clutch is again engaged and thereby ready for use.

Further, it is conceivable that the clutch be constructed without the described engagement mechanism and that re-engagement of the clutch be achieved through manual turning of those components operational in torque transmission into the original position, this being only achievable by way of externally implemented tools with which the various clutch components would have to be moved relative to one another into a re-engageable position.

It is also conceivable that the transmission bodies be arranged in the recesses in an odd number (for example 1 or 3 or 5), whereby upon disconnection of the clutch an opposed turning direction of the pressure flange and switch element would result.

Through the construction of the disconnecting clutch briefly described herein its torque transmitting components can be executed large and stable, because the disconnecting function does not require any additional support elements. Large robustness of the clutch and thereby higher reliability so as a long life can thereby result. Furthermore, the clutch according to the invention can be manufactured very cost effectively.

Further characteristics and advantageous details of the disconnecting clutch according to the invention emerge from the description and the following preferred embodiments.

Shown are.

Figure 1:
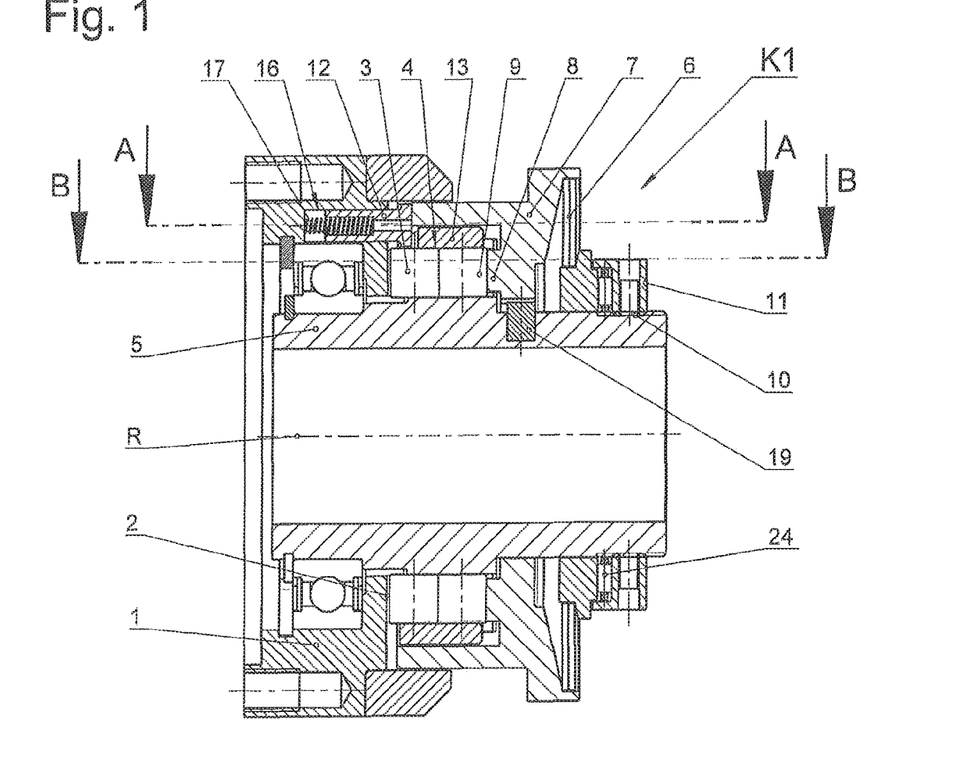
FIG. 1 a longitudinal section through a clutch according to the invention with cylindrical rollers as transmission bodies in the engaged condition, FIG. 2 a longitudinal section A-A through the clutch of FIG. 1, FIG. 3 a further longitudinal section B-B through the clutch of FIG. 1, FIG. 4 an exploded representation of the clutch according to the invention, FIG. 5 a longitudinal section through the clutch according to the invention having cylindrical rollers as transmission bodies in the disengaged condition, FIG. 6 a longitudinal section C-C through the clutch of FIG. 5, FIG. 7 a further longitudinal section D-D through the clutch of FIG. 5, FIG. 8 a longitudinal section through the clutch according to the invention with cylindrical rollers and a short first lobe in the engaged condition, FIG. 9 a longitudinal section E-E through the clutch of FIG. 8 engaged, FIG. 10 a longitudinal section E-E through the clutch of FIG. 8 disengaged, FIG. 11 a longitudinal section through a clutch according to the invention with balls as transmission bodies in the engaged condition.

FIG. 1 shows the fundamental construction of the clutch (K1) according to the invention. Torque transmission of the clutch follows from the drive element, here identified as the pressure flange (1), rotationally mounted on the hub (5) about the rotation axis (R) via the pressure flange depressions (2) onto the first transmission bodies (3), here depicted as cylindrical rollers, and then via first hub recesses (4) arranged parallel to the axis and then to the hub (5). The first transmission bodies (3) are held in the pressure flange depressions (2) through the force of spring elements (6), wherein the force of the spring elements (6) acts on the first transmission bodies (3) by way of the switch element (7), the first switch element lobes (8) and the second transmission bodies (9). The force of the spring elements can be varied by way of an adjusting nut (11) attached to the hub (5) by way of a hub thread (10).

On the facing free surface (21) of the switch element (7) several axially prominent switch element lobes (8) are arranged distributed on the circumference, which in the engaged condition of the clutch penetrate the hub recesses (4) and ultimately act upon the transmission bodies (9, 3) into the pressure flange depressions (2) with the adjusted force of the spring elements (6).

The first and second transmission bodies (3, 9) are held by way of a control sleeve (13) attached firmly to the hub (5) in the first hub recesses (4) which are cut radially into the hub (5) or into a circumferential flange radially protruding therefrom.

Figure 2:
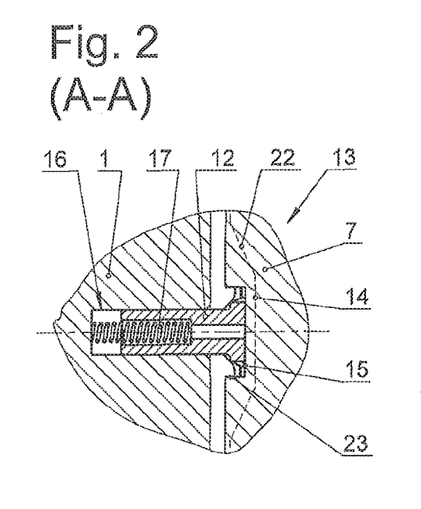

For re-engagement of the clutch (K1) an easily identifiable system is seen from FIG. 2 comprising a number of control pins (12) distributed on the circumference, the control sleeve (13) with the control cams (14) arranged thereon and from the switch element (7) with the control grooves (15) arranged thereon. The control pins (12) are stored axially movably in pin bores (16) in the pressure flange (1) which are preferably arranged parallel to the axis of the rotational axis of the clutch on a further/third reference circle. Herein, this reference circle diameter of the pin bores (16) is chosen such that the control pins are pressed with pin springs (17) equally against the control cams (14) of the control sleeve (13) and the control grooves (15) of the switch element (7). In the represented engaged condition of the clutch (K1) the control pins (12) protrude into the control cams (14) and the control grooves (15).

Figure 3:
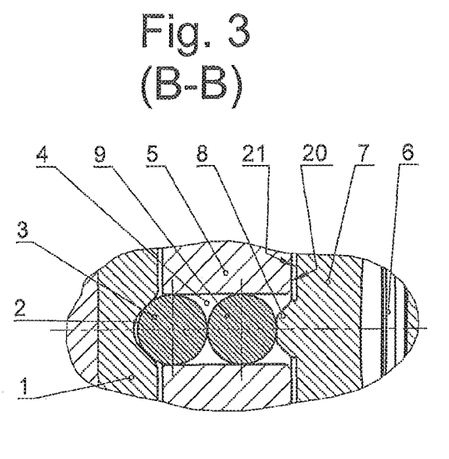

FIG. 3, which likewise shows the clutch in the engaged condition, further shows the position of the switch element (7) acted upon by the force of the spring elements (6), with the first switch element lobes (8) protruding from the free face (21) immerse into the first hub recesses (4) and press the first and second transition bodies (3, 9) against the pressure flange depressions (2) of the pressure flange (1). The axial immersion of the first switch element lobes (8) into the first hub recesses (4) ensures that the switch element (7) of the engaged clutch (K1) cannot turn in relation to the hub (5).

At disengagement of the clutch (K1) upon reaching the set limiting torque, the torque acting between the pressure flange (1) and the hub (5) produces via the cone-shaped pressure flange depressions a reaction against the force of the spring elements (6) which exceeds the force of the spring elements (6). As a result, the first transmission bodies (3) roll out of the pressure flange depressions (2), wherein the first transmission bodies (3) turn in a first rotational direction around their own axes. Through contact with the second transmission bodies (9) these are placed into rotation in the opposite rotational direction and give this rotational movement onto the first switch element lobes (8) of the switch element (7). This eventually results in the pressure flange (1) and the switch element (7) rotating in the same direction in relation to the hub (5), wherein the switch element (7) forms a combination of a rotational movement and an axial movement directed against the force of the spring elements (6).

Ease of turning between the switch element (7) and the hub (5) is enabled through an axial bearing positioned between the adjusting nut (11) and spring element (6).

Figure 4:
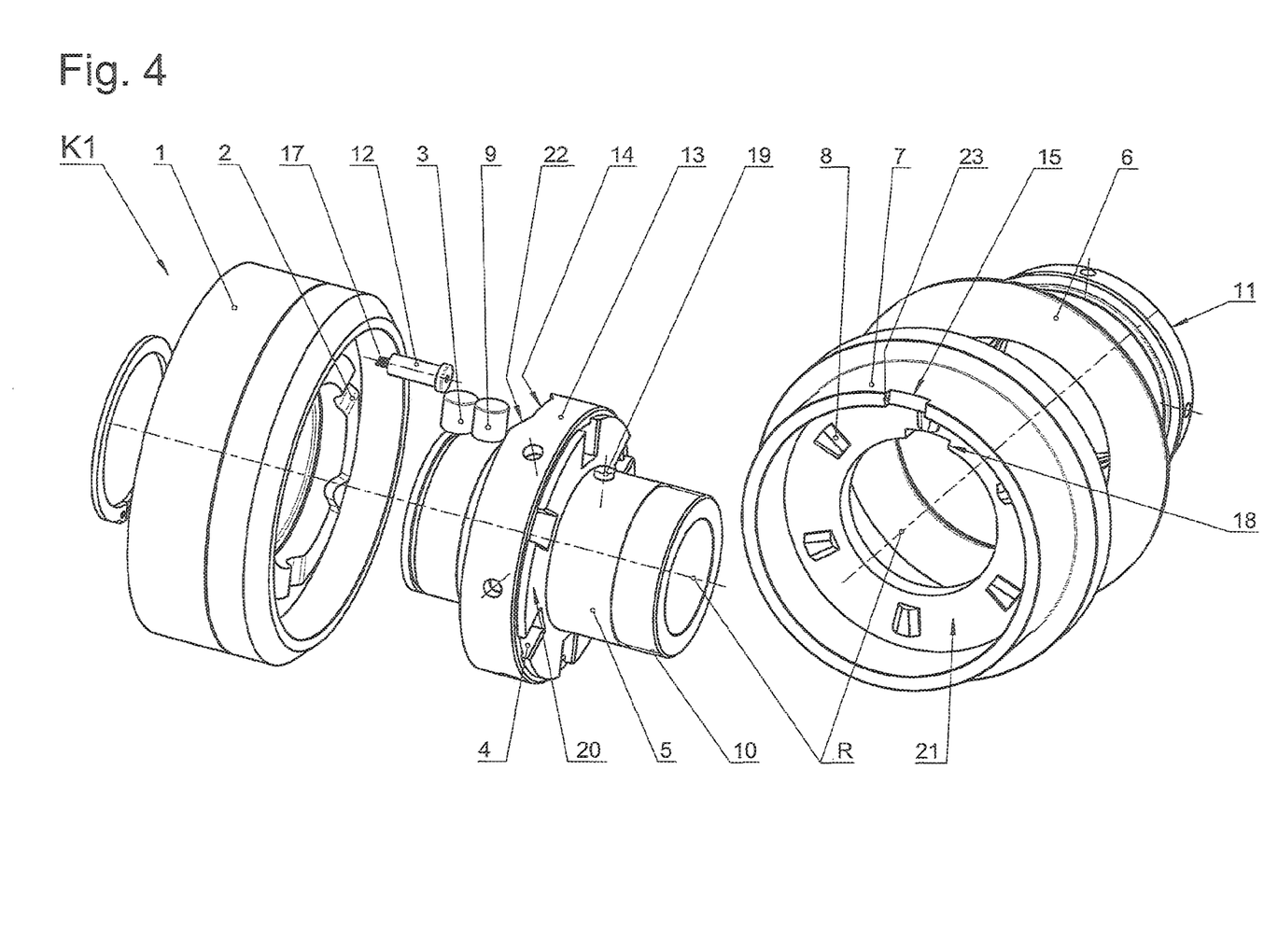

The described rotational and axial movement of the switch element (7) finishes when the stop surface (18) of the switch element (7) reaches the stop (19) attached to and protruding from the hub (5) as can be seen in the exploded diagram in FIG. 4.

Figure 5:
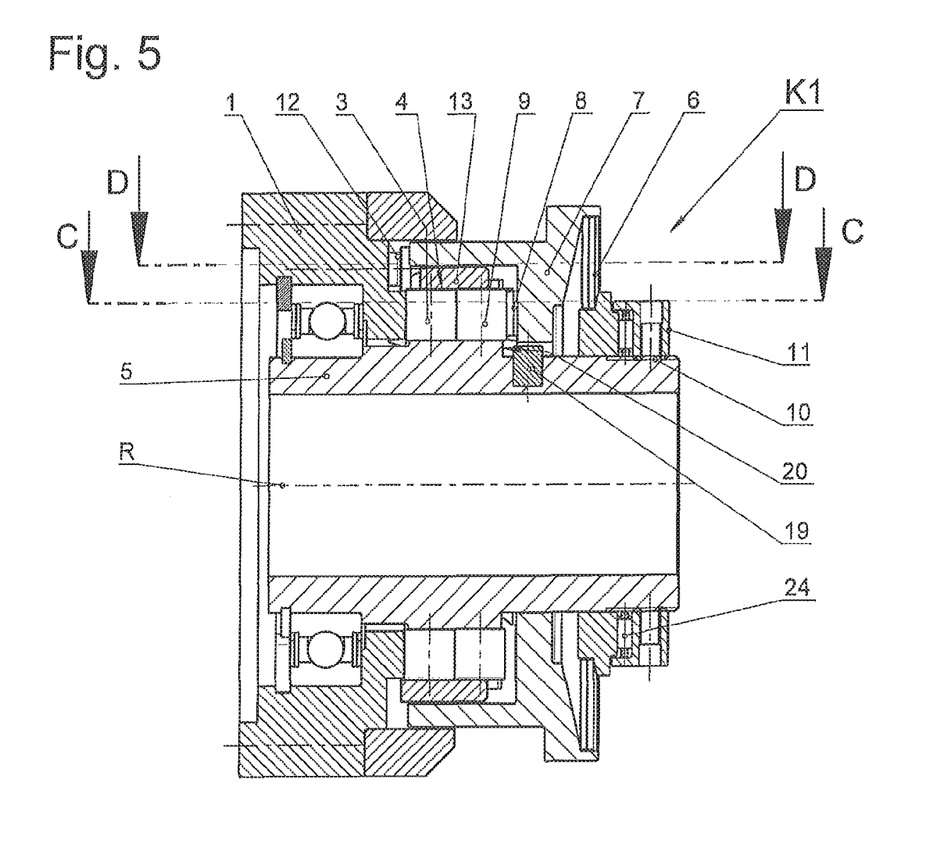
Figure 6:
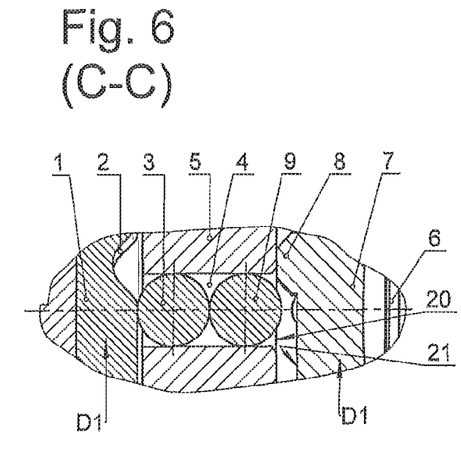

By way of the described axial and rotational movement of the switch element (7) the first switch element lobes (8) have left the hub recesses (4) and in the disengaged state of the clutch (K1) transfer the force of the spring elements (6) to the support surfaces (20) of the hub as can be seen from FIG. 5 and FIG. 6. Also visible is how in this disengaged condition the first transmission bodies (3) out of engagement with the pressure flange depressions (2) are situated next to these and how the second transmission bodies (9) stand opposite and separated from the free face (21) of the switch element (7). The clutch (K1) is disengaged and the pressure flange (1) can run down in the represented disengagement direction (D1) relative to the hub (5) without transmitting any torque after the torque drive is turned off as a result of the disengagement of the clutch.

Figure 7:
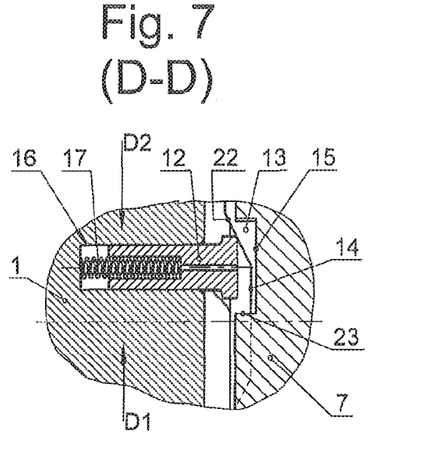

From FIG. 7 can be seen on the one hand the condition of the re-engagement system in the disengaged condition of the clutch (K1) and to the other its mode of operation during re-engagement. Upon rundown of the pressure flange (1) of the clutch (K1) in the disengagement direction (D1) on every rotation the control pins (12) protrude into the control cams (14) of the control sleeve (13) and the control grooves (15) of the switch element (7) and are then pushed back out by the control ramps (22) of the control cams (14), without thereby resulting in a movement of the other functional parts of the clutch (K1).

To re-engage the clutch (K1) the direction of rotation of the torque drive is reversed and the pressure flange (1) is rotated at low speed in relation to the hub (5) in the represented engagement direction (D2) (FIG. 7). The control pins (12) then re-insert into the control cam (14) of the control sleeve (13) and into the control groove (15) of the switch element (7). Because the switch element (7) is rotated in relation to the hub (5), the switch flank (23) of the control groove is thereby captured by the control pins (12), an entrainment of the switch element (7) then follows and a rotation between the switch element (7) and the hub (5) takes place. This turning concludes when the transmission bodies (3, 9) immerse into the depressions (2) of the pressure flange (1), when thus the first hub recess (4) on the side of the switch element (7) is freed for entry of the first switch element lobe (8), when the first switch element lobes (8) again engage the first hub recesses (4) and when there through the force of the spring elements (6) is again loaded on the transmission bodies (3, 9) and the pressure flange recesses (2). The clutch (K1) is again ready for use and can transmit the full pre-set torque.

Owing to the symmetrical construction of the internal mechanisms of the clutch in the circumferential direction the clutch can be used in either direction. Following disengagement, re-engagement is always in the opposing rotational direction to disengagement.

Figure 8:
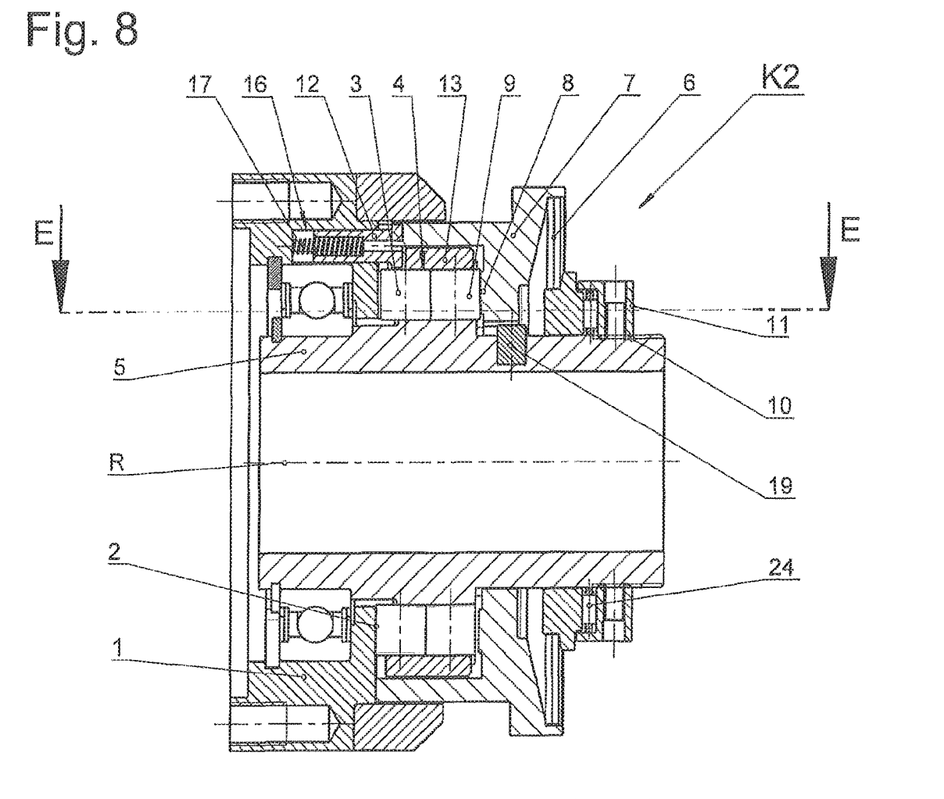
Figure 9:
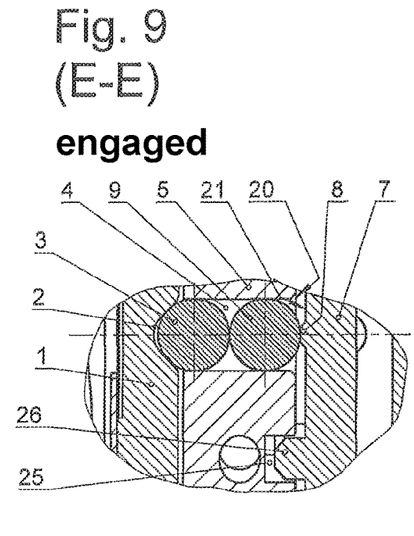
Figure 10:
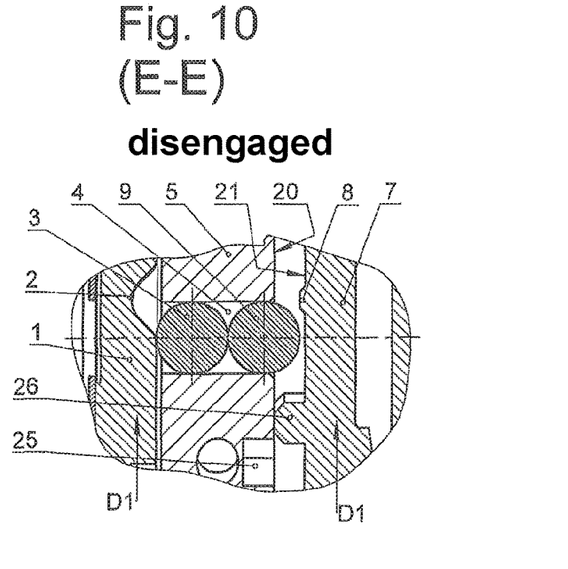

FIG. 8 shows a longitudinal section of a further embodiment of the clutch (K2) according to the invention which is presented in further detail in the cross sectional representations of FIG. 9 and FIG. 10. The clutch shown in FIG. 9 is herein shown in the engaged condition.

The pressure flange recesses (2) and the first hub recesses (4) align with one another, wherein the first and second transmission bodies (3, 9) are pressed into the pressure flange recesses (2) by the force of the spring elements (6) and thereby transfer a torque between the pressure flange (1) and the hub (5). Further, also the force of the spring elements (6) is transferred via the first switch element lobes (8) of the switch element (7) to the transmission bodies (3, 9). Furthermore, here the first switch element lobes (8) are shorter in the axial direction in order that they cannot extend axially into the first hub recesses (4). Such that in the engaged condition of the clutch (K2) the switch element (7) cannot turn with respect to the hub (5), additional second switch element lobes (26) are disposed on the switch element (7), which axially extend into further second hub recesses (25) and thereby form an interlocking connection of the clutch (K2) in the direction of rotation.

Upon disengagement of the clutch (K2) the rotational movement of the pressure flange is again transferred via the transmission bodies (3, 9) to the first switch element lobes (8), which produces the arrangement shown in FIG. 10. Herein, the pressure flange recesses (2) and the switch element (7) with first and second switch element lobes (8, 26) are turned against the hub (5) in the represented disengagement direction (D1). The first switch element lobes (8) are now so far displaced from the second transmission bodies (9) that the latter is no longer loaded with the force of the spring elements (6). The second switch element lobes (26) are now displaced to the second hub recesses (25) and support the force of the spring elements (6) onto the support face (20) of the hub (5).

The clutch (K2) described in relation to FIG. 8, FIG. 9 and FIG. 10 as with the clutch described with FIG. 1 to FIG. 7 features a system for re-engagement which essentially is composed of control pins (12) which work together with the control cams (14), the hub (5) and the control grooves (15) of the switch element.

Figure 11:
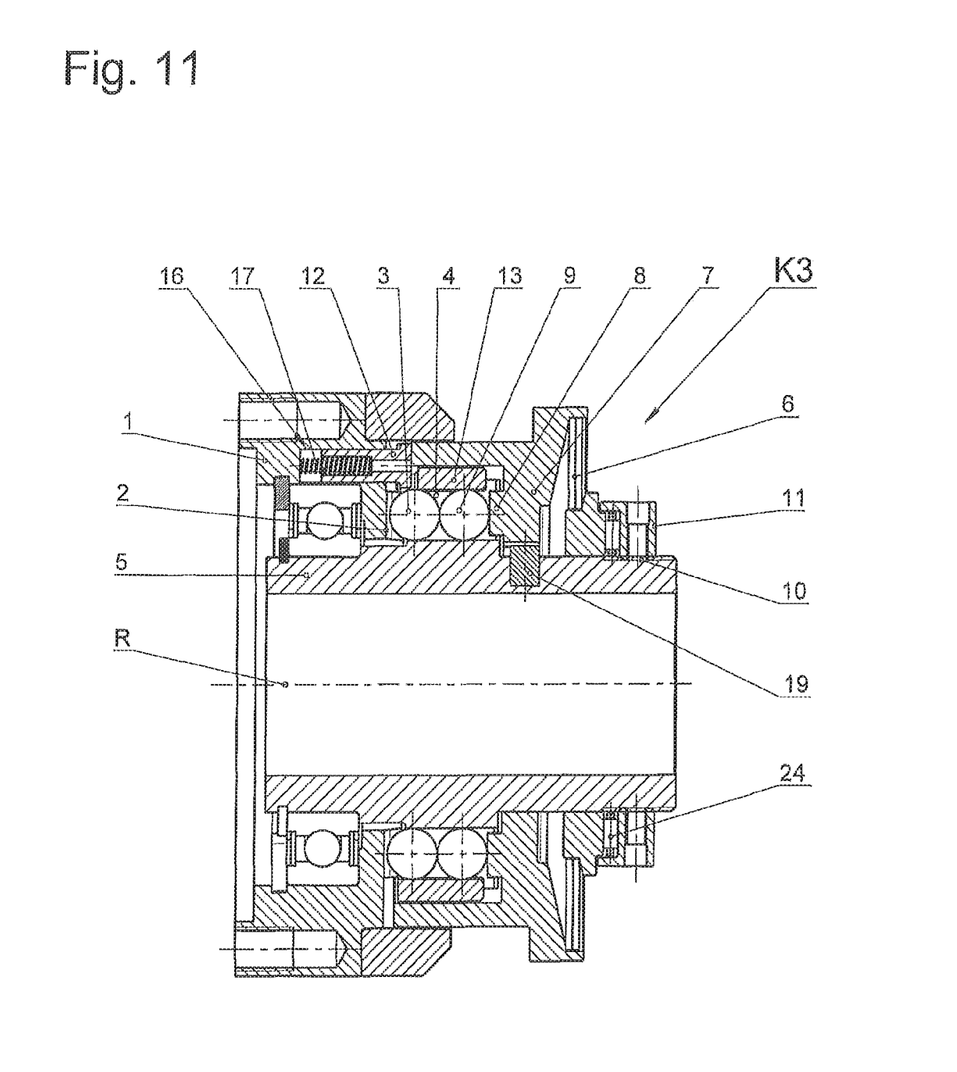

FIG. 11 shows a final embodiment of a clutch (K3) in accordance with the invention, wherein the transmission bodies (3, 9) are executed as balls. The advantage of this embodiment is a further simplification of production as well as a further reduction in manufacturing costs. It is conceivable that the hub recesses (4) be executed as bores, wherein the hub (5) and the control sleeve (13) arranged thereon can be executed as a single component.

In respect of the fundamental mode of operation clutch (K3) shown here corresponds to clutch (K1) described under FIG. 1 to FIG. 7.

It is further contemplated that other rotationally symmetrical rolling bodies be used as the transmission bodies (3, 9) described above. By way of example, it is possible to implement barrel-shaped or conical rollers.

Further, having consideration to the number of transmission bodies (3, 9) used in the individual first hub recesses (4) variations to the presented embodiments are conceivable: for clutch variants the described system for re-engagement by way of reversal of the direction of rotation an arbitrary number of further transmission bodies can be arranged in the hub recesses (4) between the first transmission bodies (3) and the second transmission bodies (9), wherein the number of additional transmission bodies must be of an even number such that the pressure flange (1) and switch element (7) rotate in the same direction.

For clutch variants having the described manual system of re-engagement an arbitrary odd number of additional transmission bodies can be arranged in the hub recesses (4) between the first transmission bodies (3) and the second transmission bodies (9), because upon disengagement of the disconnecting clutch an opposed direction of rotation between the pressure flange (1) and the switch element (7) is also acceptable. Likewise, with the manual system of re-engagement the second transmission bodies (9) can be completely done away with so that the force of the spring elements (6) acts directly on the first transmission bodies (3) and hold these in the pressure flange recesses (2).

In the exploded representation of FIG. 4 six equally spaced pressure flange recesses (2) on a reference circle and equally six groups of first and second transmission bodies (3, 9) can be seen. By analogy, it is also conceivable that a lesser or larger number of pressure flange recesses (2) with corresponding transmission bodies (3, 9) be arranged—as is the possibility that these be at different separations to each other on the reference circle.

Equally, it is also possible that the system for re-engagement of the clutch composing control pins (12), control cams (14) and control groove (15) is arranged once or multiply on the circumference of the clutch.

In summary, this application relates to a disconnecting overload clutch with a hub (5) with axially disposed hub recesses (4) on its circumference and with a pressure flange (1) rotationally mounted on the hub (5) having axially directed pressure flange recesses (2), wherein in each of the hub recesses (4) two rotationally symmetrical transmission bodies (3, 9) are arranged which are pressed into the pressure flange recesses (2) by spring elements (6) by way of a switch element (7). The switch element (7) is according to the invention disposed with axially protruding switch element lobes (8) on its frontal free face (21) which in the engaged condition transmit the force of the spring elements (6) to the transmission bodies (3, 9) and thereby engage axially into the hub recesses (4). Upon disengagement the switch element (7) with the switch element lobes (8) undergoes an axial translation and a rotation movement in relation to the hub (5), so that the switch element lobes (8) are moved into a position that the force of the spring elements (6) is only transferred to a support face (20) of the hub (5) with the result that the clutch can run down freely.

LIST OF REFERENCE SIGNS

1 Pressure flange
2 Pressure flange recess
3 First transmission body
4 First hub recess
5 Hub
6 Spring element
7 Switch element
8 First switch element lobe
9 Second transmission body
10 Hub thread
11 Adjusting nut
12 Control pin
13 Control sleeve
14 Control cam
15 Control groove
16 Pin bore
17 Pin spring
18 Stop face
19 Stop part
20 Support face
21 Free face
22 Control ramp
23 Switch flank
24 Axial bearing
25 Second hub recess
26 Second switch element lobe
D1 Disengagement direction
D2 Engagement direction
K1 Clutch (with rollers as transmission bodies)
K2 Clutch (with rollers as transmission bodies with first and second hub recesses and with first and second switch element lobes)
K3 Clutch (with balls as transmission bodies)
R Rotational axis

The invention claimed is:

1. Positive connection disconnecting overload clutch with:
a hub (5) with first hub recesses (4) arranged along its circumference, and
with a pressure flange (1) rotationally mounted on the hub (5) and having axially aligned pressure flange recesses (2),
wherein in each of the first hub recesses (4) an even number of rotationally symmetrical transmission bodies (3, 9) is arranged,
wherein the transmission bodies (3, 9) are pressed into the pressure flange recesses (2) through a switch element (7) acted upon by the force of spring elements (6),
wherein the clutch can be brought out of the engagement through an externally working torque between the hub (5) and the pressure flange (1) in a first or second rotational direction (D1, D2), and
wherein the transmission bodies (3, 9) move against the force of the spring elements (6) out of the pressure flange recesses (2) into the first hub recesses (4),
characterized in that
the switch element (7) is disposed with axially protruding first switch element lobes (8) which in the engaged condition of the overload clutch transfer the force of the spring elements (6) onto the transmission bodies (3, 9) in a direction toward the pressure flange (1),
that the first switch element lobes (8) engage into the first hub recesses (4),
that upon disengagement of the clutch by way of the rolling movement between the transmission bodies (3, 9) the pressure flange (1) and the first switch element lobes (8) of the switch element (7), the pressure flange (1) and the switch element (7) turn in the same sense relative to the hub (5),
that to limit the rotational movement between the hub (5) and the switch element (7) suitable stop elements (18, 19) are arranged, such that the first switch element lobes (8) following conclusion of the rotational movement in the circumferential direction are disposed next to the first and second hub recesses (4, 25),
that subsequently the first switch element lobes (8) transfer the force of the spring elements (6) onto a support surface (20) of the hub,
and that next to the first switch element lobes (8) is a free face (21) of the switch element (7) recessed in the axial direction, which in the disengaged condition of the clutch allows the transmission bodies (3, 9) such clearance that these no longer protrude into the pressure flange recesses (2).

2. The positive connection disconnecting overload clutch according to claim 1, characterized in that
in each of the first hub recesses (4) an even number of rotationally symmetrical transition bodies (3, 9) is arranged,
that thereby upon disengagement of the clutch the pressure flange (1) and the switch element (7) rotate against the hub (5) in the same sense.

3. The positive connection disconnecting overload clutch according to claim 1, characterized in that
the clutch can again be brought into engagement through an additional re-engagement mechanism composed of spring loaded control pins (12), control cams (14) and control grooves (15), wherein re-engagement of the clutch follows a reversal of a first rotational direction (D1) to an opposing second rotational direction (D2) between the hub (5) and the pressure flange (1).

4. The positive connection disconnecting overload clutch according to claim 3, characterized in that the control pins are placed in pin bores (16) of the pressure flange (1), that the control cams (14) are firmly attached to the hub (5) and that the control grooves are in firm connection with the switch element (7).

5. The positive connection disconnecting overload clutch according to claim 1, characterized in that through external intervention the clutch can be brought back into engagement in such a manner that the re-engagement of the clutch is through an alignment of the pressure flange depressions (2) and the hub recesses (4) and through a subsequent turning of the switch element (7) against a disengagement direction.

6. The positive connection disconnecting overload clutch according to claim 1, characterized in that the transmission bodies (3, 9) comprise cylindrical rollers.

7. The positive connection disconnecting overload clutch according to claim 1, characterized in that the transmission bodies (3, 9) comprise balls and that the axially aligned recesses (4) of the hub (5) for acceptance of the transmission bodies (3, 9) comprise bores.

8. Positive connection disconnecting overload clutch with:
a hub (5) with first hub recesses (4) arranged along its circumference, and
with a pressure flange (1) rotationally mounted on the hub (5) and having axially aligned pressure flange recesses (2),
wherein in each of the first hub recesses (4) an even number of rotationally symmetrical transmission bodies (3, 9) is arranged,
wherein the transmission bodies (3, 9) are pressed into the pressure flange recesses (2) through a switch element (7) acted upon by the force of spring elements (6),
wherein the clutch can be brought out of the engagement through an externally working torque between the hub (5) and the pressure flange (1) in a first or second rotational direction (D1, D2), and
wherein the transmission bodies (3, 9) move against the force of the spring elements (6) out of the pressure flange recesses (2) into the first hub recesses (4),
characterized in that
the switch element (7) is disposed with axially protruding first switch element lobes (8) which in the engaged condition of the overload clutch transfer the force of the spring elements (6) onto the transmission bodies (3, 9) in a direction toward the pressure flange (1),
that, in the engaged status of the clutch, the first switch element lobes (8) are aligned with the first hub recesses (4) and additionally disposed second switch element lobes (26) engage in second hub recesses (25),
that upon disengagement of the clutch by way of the rolling movement between the transmission bodies (3, 9) the pressure flange (1) and the first switch element lobes (8) of the switch element (7), the pressure flange (1) and the switch element (7) turn in the same sense relative to the hub (5),
that to limit the rotational movement between the hub (5) and the switch element (7) suitable stop elements (18, 19) are arranged, such that the first and second switch element lobes (8, 26) following conclusion of the rotational movement in the circumferential direction are disposed next to the first and second hub recesses (4, 25),
that subsequently the second switch element lobes (26) transfer the force of the spring elements (6) onto a support surface (20) of the hub,
and that next to the first and second switch element lobes (8, 26) is a free face (21) of the switch element (7) recessed in the axial direction, which in the disengaged condition of the clutch allows the transmission bodies (3, 9) such clearance that these no longer protrude into the pressure flange recesses (2).

9. The positive connection disconnecting overload clutch according to claim 8, characterized in that
in each of the first hub recesses (4) an even number of rotationally symmetrical transition bodies (3, 9) is arranged,
that thereby upon disengagement of the clutch the pressure flange (1) and the switch element (7) rotate against the hub (5) in the same sense.

10. The positive connection disconnecting overload clutch according to claim 8, characterized in that
the clutch can again be brought into engagement through an additional re-engagement mechanism composed of spring loaded control pins (12), control cams (14) and control grooves (15),
wherein re-engagement of the clutch follows a reversal of a first rotational direction (D1) to an opposing second rotational direction (D2) between the hub (5) and the pressure flange (1).

11. The positive connection disconnecting overload clutch according to claim 10, characterized in that the control pins are placed in pin bores (16) of the pressure flange (1), that the control cams (14) are firmly attached to the hub (5) and that the control grooves are in firm connection with the switch element (7).

12. The positive connection disconnecting overload clutch according to claim 8, characterized in that through external intervention the clutch can be brought back into engagement in such a manner that the re-engagement of the clutch is through an alignment of the pressure flange depressions (2) and the hub recesses (4) and through a subsequent turning of the switch element (7) against a disengagement direction.

13. The positive connection disconnecting overload clutch according to claim 8, characterized in that the transmission bodies (3, 9) comprise cylindrical rollers.

14. The positive connection disconnecting overload clutch according to claim 8, characterized in that the transmission bodies (3, 9) comprise balls and that the axially aligned recesses (4) of the hub (5) for acceptance of the transmission bodies (3, 9) comprise bores.

* * * * *